J. F. Townsend,
Hinge.
No. 1,396. Reissued Feb. 3, 1863.
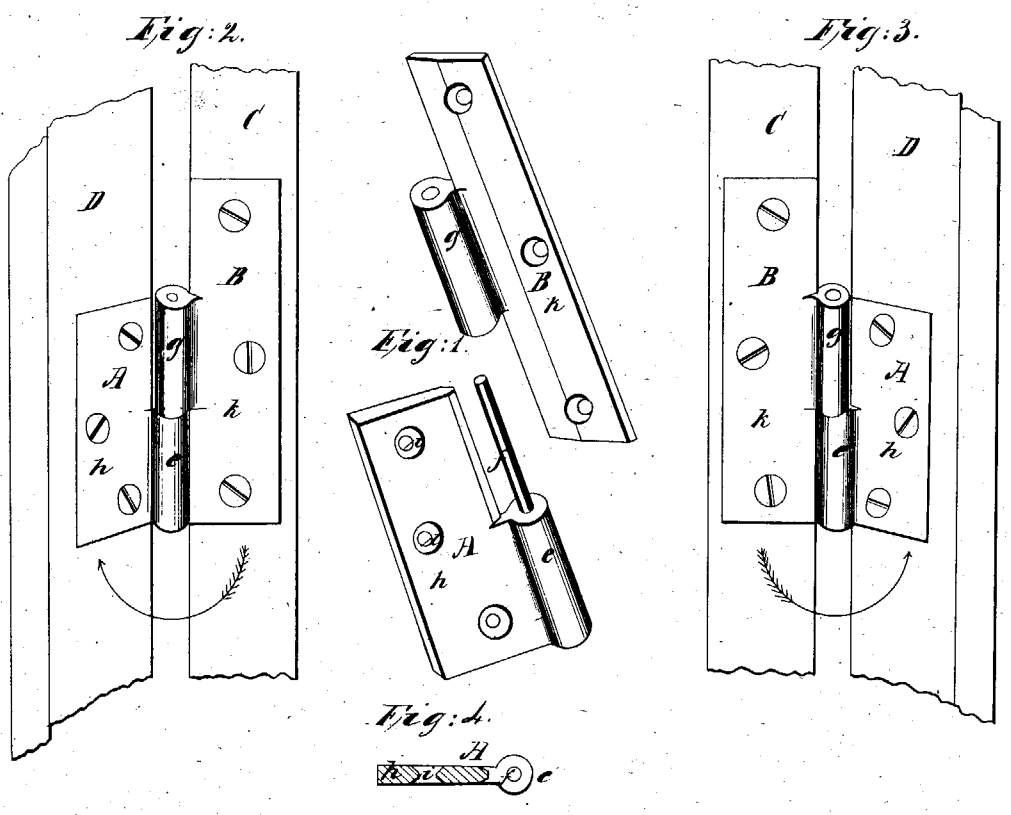
Witnesses:
Chas T. Spencer
R. J. Osgood.
Inventor:
Jno. F. Townsend
by J. Fraser & Co. Attys

UNITED STATES PATENT OFFICE.

JOHN F. TOWNSEND, OF WESTFIELD, AND PASCAL P. PRATT, OF BUFFALO, NEW YORK, ASSIGNEES OF SAID JOHN F. TOWNSEND.

IMPROVEMENT IN BUTT-HINGES.

Specification forming part of Letters Patent No. 36,883, dated November 4, 1862; Reissue No. 1,396, dated February 3, 1863.

*To all whom it may concern:*

Be it known that JOHN F. TOWNSEND, of Westfield, in the county of Chautauqua and State of New York, did invent certain new and useful Improvements in Right and Left Butt-Hinges, for which Letters Patent of the United States were granted himself and PASCAL P. PRATT, of Buffalo, New York, on the 4th day of November, 1862; and we do hereby declare that the following is a full and exact description thereof, reference being had to the accompanying drawings, making part of this specification.

Figure 1 is a perspective view of our improved hinge, with its two parts separated; Fig. 2, a view of the same as applied to a left-hand door, a portion of the door and jamb being show in elevation; Fig. 3, a similar view showing the hinge as applied to a right-hand door; Fig. 4, a horizontal cross-section of the base or jamb portion of the hinge through one of the screw-holes.

Like letters of reference indicate corresponding parts in all the figures.

Ordinary loose-jointed butt-hinges are made up of two parts—a base or supporting portion secured rigidly to the jamb, and a movable portion, connected with it, secured to the door. The former consist of a knuckle or "round" supporting a pin or axis, and provided with a leaf by which it is secured to the wood, and the latter of a socket fitting over the pin of the jamb-piece and a leaf of similar shape. In both parts the leaf projects tangentially from the knuckle or socket; or, in other words the latter is situated laterally or on one side of the plane of the leaf, so that when the two parts are united they will fold together in contact without difficulty. It is manifest that a hinge constructed in this way can be used on only one side of a door, for if removed to the other side the knuckle of the base or jamb portion will project on the wrong side of the leaf, or if made to project on the right side the pin or axis will be inverted.

Our invention consists, first, in adapting the base or jamb piece to use on either side of the door, by a peculiar construction, hereinafter described; and, secondly, in the use, in connection therewith, of a movable piece, which is adapted to use on either side by being inverted, thereby producing a reversible or right and left hand hinge.

To accomplish the result desired, the base or jamb piece A, Fig. 1, has a knuckle or round, *e*, of the usual size and shape, and extending upward a suitable height—say about half the height of the hinge, more or less—and to this knuckle is secured the pin or axis *f*, which forms the bearing of the hinge in the usual manner. The leaf *h*, instead of projecting tangentially, or from one side of the knuckle, as in the common device, projects radially or centrally, as clearly represented, and the holes *i i* for the reception of the screws, instead of being countersunk on only one side, as ordinarily done, are countersunk on both sides, as indicated most clearly in Fig. 4. This portion of the hinge thus formed is perfectly adaptable to use on either the right or left hand side, as will presently be described.

The movable portion B of the hinge, or that portion which is secured to the door, is substantially of the shape represented at the top in Fig. 1, and does not differ very essentially from the corresponding piece of the ordinary hinge—that is, it has the ordinary socket, *g*, of suitable size and height, from which projects tangentially, or from one side, the ordinary leaf, *k*, and its screw-holes are countersunk on only one side. We prefer to make the leaf of this portion of the hinge longer than that of the other, but proportionably lighter, as it admits of more screws and of placing them farther apart, so that a stronger fastening is obtained, and the door is less liable to sag or work loose on the hinges. This, however, is not absolutely required, and this leaf may, if desired, be made of equal size as or even smaller than the other, the relative size and proportion not affecting the principle of its construction. Thus arranged, there is no difficulty in applying the hinge for right or left hand use. In Fig. 2 it is represented as applied on the left, and in Fig. 3 on the right, the jamb being indicated by D, and the edge of the door by C. To change from one to the other, it is only necessary to reverse the base-piece A, or place it the other side out, the change making no difference with the relative position of its knuckle and pin, which are in a radial line with the leaf, and then invert the movable piece B, so as to change the position of its leaf relatively to that of A. Thus, by making the base-piece A with its leaf projecting on a central plane, and countersinking its screw-holes on both sides, so as to be placed either side out, it is perfectly adapted to the purpose desired, and can be used with the ordinary tangential socket-piece, B, to form a perfect right and left hinge. The advantages of this special construction of the base-piece are apparent—without it the perfect device cannot be produced.

This hinge thus produced is as simple, cheap, and effective as the ordinary butt-hinge, with the additional advantage of its twofold use. It is put together in the same manner, and is as little limited in the extent of its turning motion. The socket of the movable piece, by projecting out laterally from the plane of the leaf, allows the door to close and fit closely in its seat in the frame, the two parts of the hinge being sunk flush into the wood-work, as usual, and thus presenting a neat appearance.

We are aware that screw-holes countersunk on both sides have before been employed in other relations, but such we do not claim separately; but

What we claim as the invention of the said JOHN F. TOWNSEND is—

1. The base or sustaining portion A of the hinge, consisting of the leaf *h*, projecting radially or centrally from the knuckle *e* and pin *f*, and having screw holes *i i* countersunk on each side thereof, the whole arranged and operating substantially as described, and for the purpose herein set forth.

2. In combination with the base-piece A thus formed, the movable piece B, with its leaf projecting tangentially from the socket in such a manner that by inverting it it is adapted to right and left use, as herein specified.

In witness whereof we have hereunto set our hands this 8th day of December, 1862.

JOHN F. TOWNSEND.
P. P. PRATT.

Witnesses:
L. A. SKINNS,
G. N. S. FISHER.

Witnesses to P. P. Pratt's signature:
E. E. S. WARREN,
F. L. DANFORTH.